(12) United States Patent
Vasudevan et al.

(10) Patent No.: US 9,697,351 B1
(45) Date of Patent: Jul. 4, 2017

(54) PROVIDING A HIGH SECURITY PASSWORD FROM AN INITIAL CHARACTER STRING OF LOWERCASE LETTER AND NUMBERS, AND INCLUSION OF ONE OR MORE OTHER CHARACTERS

(71) Applicant: EMC IP Holding Company LLC, Hopkinton, MA (US)

(72) Inventors: Mahadevan Vasudevan, Ashland, MA (US); Gregory W. Lazar, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 14/753,217

(22) Filed: Jun. 29, 2015

(51) Int. Cl.
*G06F 21/00* (2013.01)
*G06F 21/46* (2013.01)
*H04L 9/08* (2006.01)

(52) U.S. Cl.
CPC ............ *G06F 21/46* (2013.01); *H04L 9/0863* (2013.01); *H04L 9/0869* (2013.01)

(58) Field of Classification Search
CPC ....... G06F 21/31; G06F 21/46; H04L 9/3226; H04L 9/0869; H04L 9/0863
USPC ........................................................ 726/6
See application file for complete search history.

(56) References Cited

U.S. PATENT DOCUMENTS

| | | | |
|---|---|---|---|
| 6,044,468 A | 3/2000 | Osmond | |
| 7,036,016 B1* | 4/2006 | Smith, Jr. | G09C 1/00 340/5.51 |
| 8,498,417 B1 | 7/2013 | Harwood et al. | |
| 8,588,425 B1 | 11/2013 | Harwood et al. | |
| 8,594,335 B1 | 11/2013 | Izhar et al. | |
| 8,799,681 B1 | 8/2014 | Linnell et al. | |
| 9,154,304 B1 | 10/2015 | Dotan et al. | |
| 2003/0204724 A1* | 10/2003 | Ayyagari | G06F 21/445 713/168 |
| 2015/0067760 A1* | 3/2015 | Waltermann | G06F 21/6218 726/1 |

OTHER PUBLICATIONS

Helkala, Kirsi, and Einar Snekkenes. "Password generation and search space reduction." (2009).*
EMC Corporation, EMC Symmetrix Data at Rest Encryption, White Paper, Mar. 2011, Part No. h8073.1.

* cited by examiner

*Primary Examiner* — Syed Zaidi
(74) *Attorney, Agent, or Firm* — BainwoodHuang

(57) ABSTRACT

A technique supplies a high security password. The technique involves receiving, by processing circuitry, a series of randomly generated values from random number generator circuitry. The technique further involves deriving, by the processing circuitry, an initial character string from the series of randomly generated values, each character of the initial character string being an element of a first collection of characters which includes lowercase letters and numbers. The technique further involves providing, by the processing circuitry and as the high security password, a modified character string based on (i) the initial character string and (ii) inclusion of at least one element of a second collection of characters which is mutually exclusive of the first collection of characters.

16 Claims, 5 Drawing Sheets

PROVIDING A HIGH SECURITY PASSWORD FROM AN INITIAL CHARACTER STRING OF LOWERCASE LETTER AND NUMBERS, AND INCLUSION OF ONE OR MORE OTHER CHARACTERS

BACKGROUND

Some conventional data storage arrays encrypt data before storing the data on storage drives. For example, the input/output (I/O) modules in some data storage arrays encrypt data en route to the storage drives using a different encryption key for each storage drive.

Before these storage drive encryption keys are stored persistently, the storage drive encryption keys are encrypted using a randomly generated key encryption key. In one conventional data storage array, the storage drive encryption keys along with the randomly generated key encryption key are stored in an encryption key repository which is encrypted using the randomly generated key encryption key.

SUMMARY

It should be understood that the above-described randomly generated key encryption key, which is used to encrypt the storage encryption drive keys, may be derived from a password containing a series of lowercase letters and numbers, i.e., a series of simple alphanumeric digits. The strength of the encryption key derived from a password can be improved upon by increasing the randomness of the password. Along these lines, a password policy can be imposed which requires the inclusion of one or more other characters within the password.

In contrast to the above-described approach of deriving storage drive encryption keys from a password containing a series of lowercase letters and numbers, improved techniques are directed to providing a high security password from an initial character string of lowercase letters and numbers, and inclusion of one or more other characters (e.g., uppercase letters, special characters such as "!", "@", "#", "$", "%", and so on). The use of such a character combination results in a stronger password. Such a combination can also be made to comply with a set of password rules (e.g., a policy requiring the password to include exactly one uppercase letter, or one special character, or one uppercase letter and one special character, or one uppercase letter and two special characters, and so on). Due to the improved security strength of such passwords, such passwords are well suited for particular situations such as deriving stronger encryption keys.

One embodiment is directed to a method of supplying a high security password. The method includes receiving, by processing circuitry, a series of randomly generated values from random number generator circuitry. The method further includes deriving, by the processing circuitry, an initial character string from the series of randomly generated values, each character of the initial character string being an element of a first collection of characters which includes lowercase letters and numbers. The method further includes providing, by the processing circuitry and as the high security password, a modified character string based on (i) the initial character string and (ii) inclusion of at least one element of a second collection of characters which is mutually exclusive of the first collection of characters.

In some arrangements, providing the modified character string includes replacing at least one character of the initial character string with an equal number of elements of the second collection of characters to form the modified character string. Alternatively, one or more elements of the second collection can be inserted into the initial character string.

In some arrangements, the first collection of characters consists of lowercase letters and numbers, and the second collection of characters consists of uppercase letters. In some arrangements, the particular uppercase letter or letters are chosen randomly based on input from the random number generator circuitry. In some arrangements, the location or locations for the particular uppercase letter or letters are chosen randomly based on input from the random number generator circuitry.

In some arrangements, the first collection of characters consists of lowercase letters and numbers, and the second collection of characters consists of special characters such as "!", "@", "#", "$", "%", . . . . In some arrangements, the particular special character or characters are chosen randomly based on input from the random number generator circuitry. In some arrangements, the location or locations for the particular special character or characters are chosen randomly based on input from the random number generator circuitry.

In some arrangements, the first collection of characters consists of lowercase letters and numbers, and the second collection of characters consists of a set of uppercase letters and a set of special characters. Here, one or more uppercase letters are chosen randomly based on input from the random number generator circuitry. Likewise, the locations for the particular uppercase letters are chosen randomly based on input from the random number generator circuitry. Similarly, one or more special characters are chosen randomly based on input from the random number generator circuitry. Furthermore, the locations for the special characters are chosen randomly based on input from the random number generator circuitry.

In some arrangements, the method further includes storing the modified character string (or an encryption key derived from a password containing the modified character string) together with sensitive key manager configuration information in a lockbox cryptographic repository. In the context of a data storage system, such operation may involve encrypting a set of data storage system encryption keys using a key derived from a password containing the modified character string.

Another embodiment is directed to an electronic apparatus which includes random number generator circuitry, memory, and control circuitry coupled to the random number generator circuitry and the memory. The memory stores instructions which, when carried out by the control circuitry, cause the control circuitry to:

(A) receive a series of randomly generated values from random number generator circuitry, (B) derive an initial character string from the series of randomly generated values, each character of the initial character string being an element of a first collection of characters which includes lowercase letters and numbers, and (C) provide, as a high security password, a modified character string based on (i) the initial character string and (ii) inclusion of at least one element of a second collection of characters which is mutually exclusive of the first collection of characters.

It should be understood that the electronic apparatus may form a portion of a data storage system. In such a situation, the control circuitry may be further constructed and arranged to store the modified character string together (or a key derived from the modified character string) with sensitive key manager configuration information in a lockbox cryptographic repository which is encrypted using the modified character string. Here, the sensitive key manager configuration information may include an encrypted set of storage drive keys for encrypting data stored on a set of storage drives of the data storage system.

Yet another embodiment is directed to a computer program product having a non-transitory computer readable medium which stores a set of instructions to supply a high security password. The set of instructions, when carried out by computerized circuitry, causing the computerized circuitry to perform a method of:

(A) receiving a series of randomly generated values from random number generator circuitry;
(B) deriving an initial character string from the series of randomly generated values, each character of the initial character string being an element of a first collection of characters which includes lowercase letters and numbers; and
(C) providing, as the high security password, a modified character string based on (i) the initial character string and (ii) inclusion of at least one element of a second collection of characters which is mutually exclusive of the first collection of characters.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing a high security password from an initial character string of lowercase letters and numbers, and inclusion of one or more other characters.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing a high security password from an initial character string of lowercase letters and numbers, and inclusion of one or more other characters (e.g., uppercase letters, special characters such as "!", "@", "#", "$", "%", . . . , and so on). The use of such a combination of characters results in stronger security than that provided by the initial character string. Such a combination can also be made to comply with a set of password rules or protocols (e.g., one uppercase letter, one special character, one uppercase letter and one special character, one uppercase letter and two special characters, and so on). Due to the higher security strength of such passwords, such passwords are well suited for particular situations such as deriving key encryption keys, providing security via lockbox or key repositories, and so on.

Figure 1:
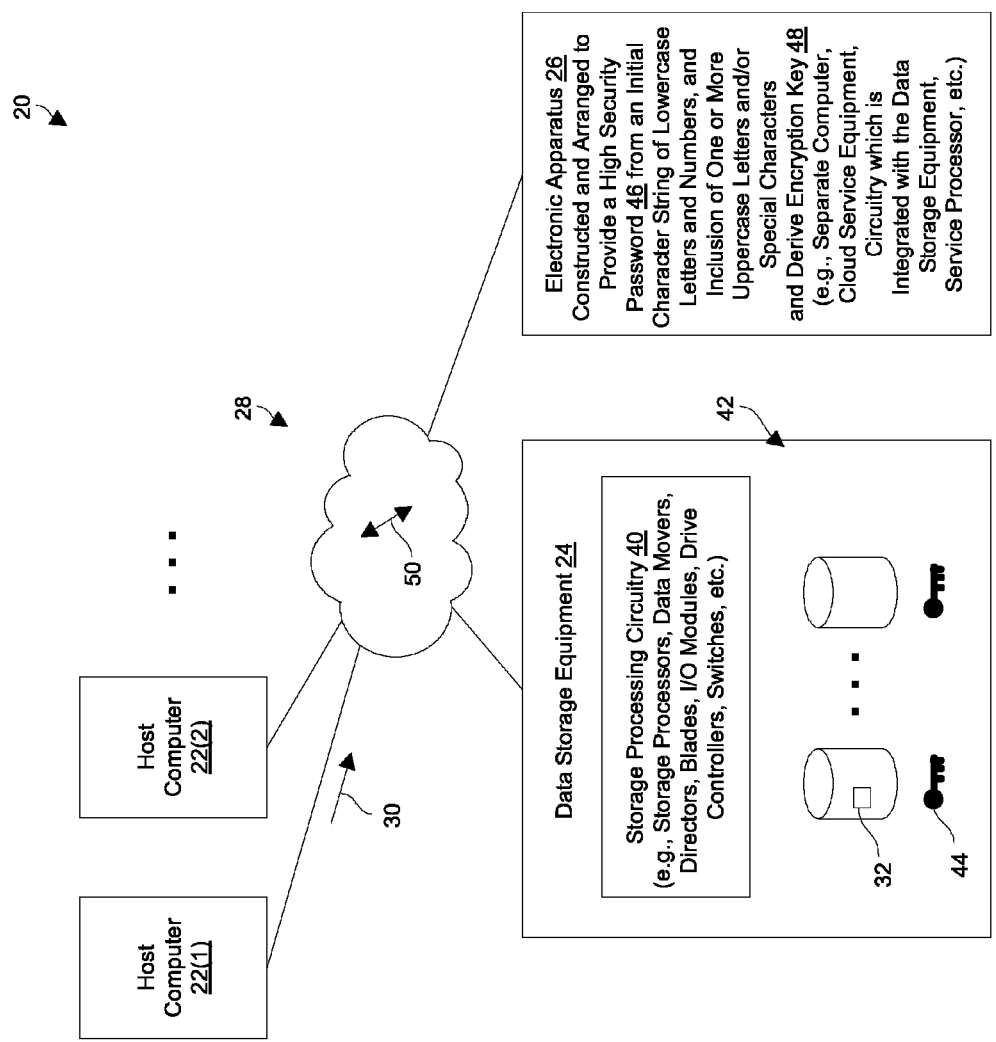
FIG. 1 is a block diagram of a data storage system which utilizes high security passwords from an initial character string of lowercase letters and numbers, and inclusion of one or more other characters.

FIG. 1 is a block diagram of a data storage environment 20 which utilizes a high security password produced from an initial character string of lowercase letters and numbers, and inclusion of one or more other characters. The data storage environment 20 includes host computers 22(1), 22(2), . . . (collectively, host computers 22), data storage equipment 24, an electronic apparatus 26 and communications medium 28.

The host computers 22 are constructed and arranged to perform useful work. For example, the host computers 22 may operate as file servers, web servers, email servers, enterprise servers, and so on, which provide input/output (I/O) requests 30 (e.g., small computer system interface or SCSI commands) to the data storage equipment 24 to store data 32 in and read data 32 from the data storage equipment 24.

The data storage equipment 24 includes storage processing circuitry 40 and an array of storage drives 42. The storage processing circuitry 40 is constructed and arranged to process the I/O requests 30 from the host computers 22 by robustly and reliably storing host data 32 in the array of storage drives 42 and retrieving the host data 32 from the array of storage drives 42 (e.g., flash memory drives, magnetic disk drives, etc.). The storage processing circuitry 40 may include one or more physical storage processors, data movers, director boards, blades, I/O modules, storage drive controllers, switches, combinations thereof, and so on. During such operation, the data 32 on each storage drive 32 is encrypted with a respective storage drive key 44 for that storage drive 32. Accordingly, the data 32 is stored securely in the event a storage drive 32 is lost, stolen, etc.

The electronic apparatus 26 is constructed and arranged to provide a high security password 46 from (i) an initial character string of lowercase letters and numbers, and (ii) inclusion of one or more uppercase letters and/or special characters. The electronic apparatus 26 is constructed and arranged to then use the high security password 46 to derive a strong encryption key 48 to encrypt the different storage drive keys 44 before the storage drive keys 44 are stored persistently. In some arrangements, the electronic apparatus 26 places the storage drive keys 44 and the derived encryption key in a key repository and encrypts the key repository using the derived encryption key 48 to safeguard these items as sensitive key manager configuration information for the data storage equipment 24. In some arrangements, the electronic apparatus 26 resides locally in the vicinity of the data storage equipment 24 (e.g., embedded within the data storage equipment, as an adjacent device, within the same facility, etc.). In other arrangements, the electronic apparatus 26 is remote to the data storage equipment 24 (e.g., at a separate physical location, within cloud services equipment, etc.).

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the electronic apparatus 26 supplies a high security password 46 for use in deriving the strong encryption key 48 which encrypts the storage drive keys 44. To supply the high security password 46, the electronic apparatus 26 randomly generates a series of hex values, derives an initial character string of lowercase letters and numbers from the series of hex values, and provides a modified character string as the high security password 46 based on the initial character string and inclusion of one or more other characters. The storage drive keys 44 are encrypted using the encryption key 48 derived from the high security password 46 before the storage drive keys 44 are stored in non-volatile memory in order to safeguard the storage drive keys 44. A key derivation function such as PBKDF2 (Password-Based Key Derivation Function 2) is suitable for generating the encryption key 48 from the high security password 46.

In some arrangements, the high security password 46 is the initial character string with one or more lowercase letters and/or numbers of the initial character string replaced with one or more uppercase characters and/or special characters (e.g., standard keyboard symbols which are neither letter nor numbers such as "!", "@", "#", "$", "%", ... ). Further details will now be provided with reference to FIG. 2.

Figure 2:
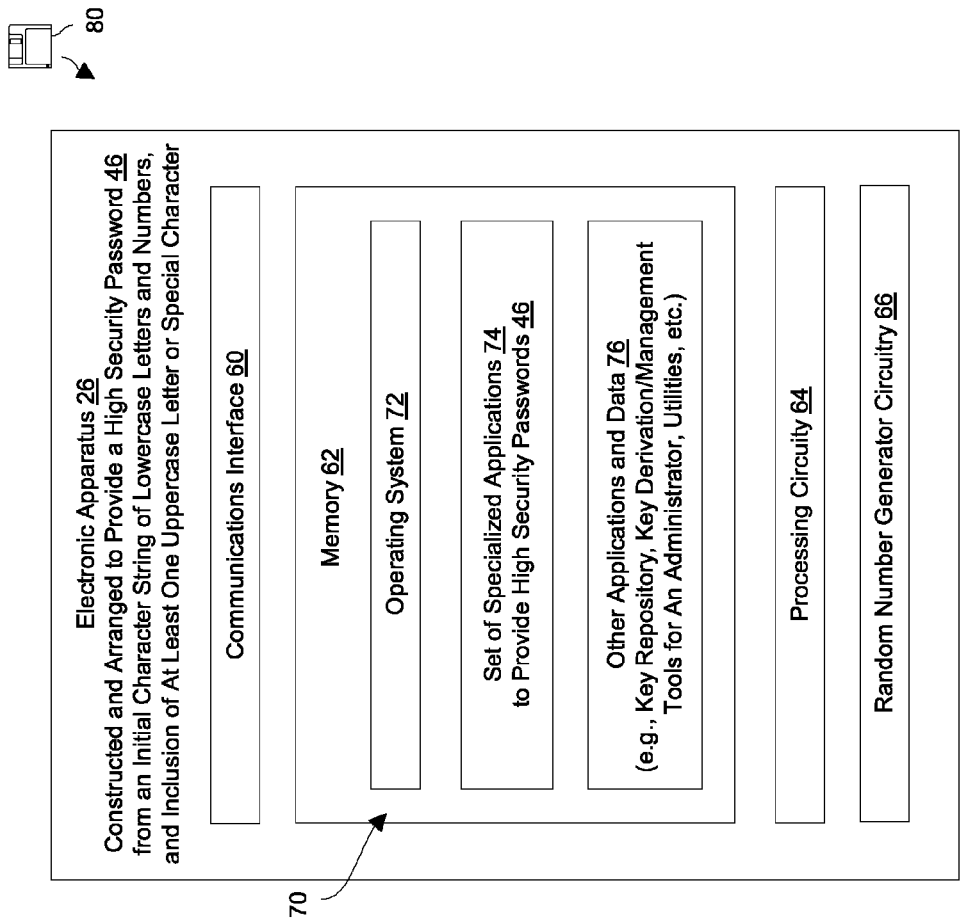
FIG. 2 is a block diagram of an electronic apparatus which provides the high security passwords.

FIG. 2 shows particular details of the electronic apparatus 26 which provides the high security password 46 from an initial character string of lowercase letters and numbers, and inclusion of at least one uppercase letter or special character. The electronic apparatus 26 includes a communications interface 60, memory 62, processing circuitry 64, and random number generator circuitry 66.

The communications interface 60 is constructed and arranged to connect the electronic apparatus 26 to the communications medium 28 (also see FIG. 1) to enable communications with other devices of the data storage environment 20 (e.g., the data storage equipment 24, the host computers 22, an external key management server, etc.). Such communications may be IP-based, SAN-based, cellular-based, cable-based, fiber-optic based, wireless, combinations thereof, and so on. Accordingly, the communications interface 60 enables the electronic apparatus 26 to robustly and reliably communicate with other external apparatus.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72 to manage resources of the electronic apparatus 26 (e.g., processor cycles, memory space, etc.), a set of specialized applications 74 to perform operations involved in supplying the high security password 46, and other applications and data 76 (e.g., applications to perform other tasks such as key derivation and management, a key repository, data storage configuration and management tools, utilities, other data storage and/or user level applications, and so on).

The processing circuitry 64 is constructed and arranged to operate in accordance with the various software constructs 70 stored in the memory 62. As will be explained in further detail shortly, the processing circuitry 64 executes the set of specialized applications 74 to provide the high security password 46. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic apparatus 26. In particular, the computer program product 80 has a non-transitory (or non-volatile) computer readable medium which stores a set of instructions which controls one or more operations of the electronic apparatus 26. Examples of suitable computer readable storage media include tangible articles of manufacture and apparatus which store instructions in a non-volatile manner such as CD-ROM, flash memory, disk memory, tape memory, and the like.

The random number generator circuitry 66 is constructed and arranged to generate random values for use in providing the high security password 46. In some arrangements, the random number generator circuitry 66 is formed by dedicated circuitry. However, the random number generator circuitry 66 may also be formed by the processing circuitry 64 executing specialized instructions (also see the other applications and data 76 in FIG. 2). It should be understood that the values from the random number generator circuitry 66 may be pseudo-random rather than truly random.

During operation, the electronic apparatus 26 performs useful work. Along these lines, the electronic apparatus 26 provides the high security password 46. Additionally, the electronic apparatus 26 may generate the storage drive keys 44 (FIG. 1), as well as securely protect them by storing them in a key repository which is encrypted with a strong encryption key 48 derived from the high security password 46. Further details will now be provided with reference to FIGS. 3 and 4.

Figure 3:
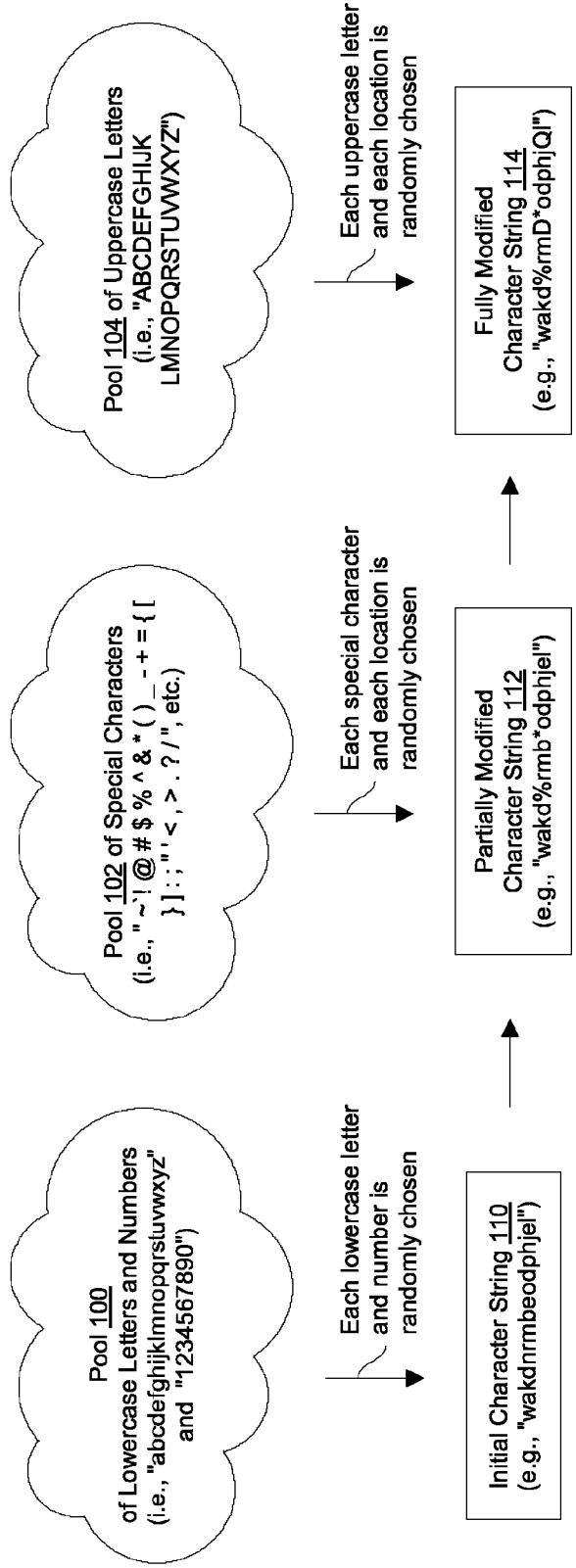
FIG. 3 is a block diagram illustrating a process of providing such high security passwords.
Figure 4:
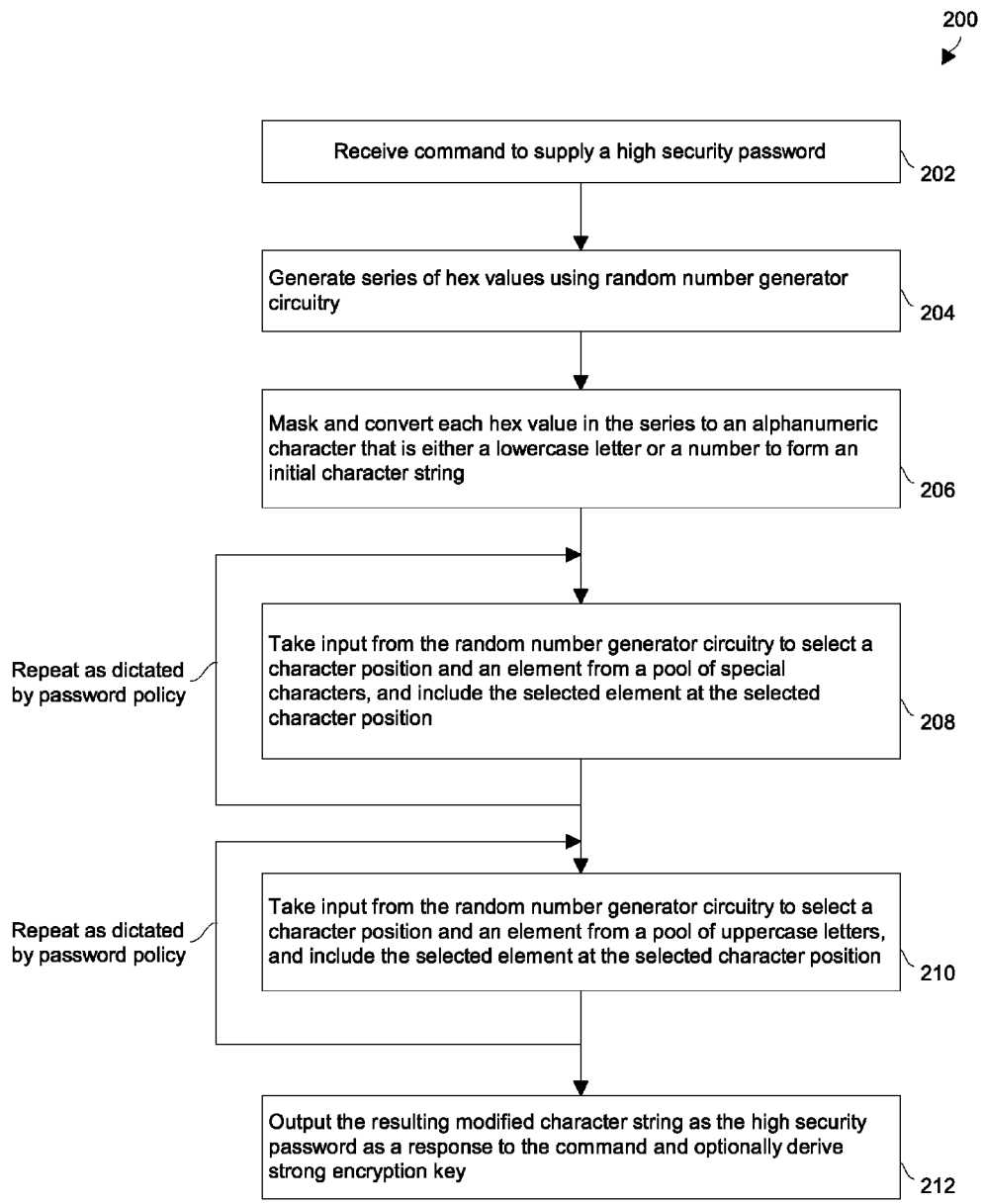
FIG. 4 is a flowchart illustrating an example process of providing a high security password which includes two uppercase letters and two special characters.

FIGS. 3 and 4 provide certain details of the process of providing the high security password 46 which is performed by the electronic apparatus 26. FIG. 3 pictorially illustrates the process of providing the high security password 46. FIG. 4 is a flowchart illustrating an example process of providing a high security password which includes two uppercase letters and two special characters.

As shown in FIG. 3, the electronic apparatus 26 makes use of different pools 100, 102, 104 of characters. In particular, the pool 100 consists of individual lowercase letters (i.e., "a", "b", "c", "d", "e", "f", "g", "h", "i", "j", "k", "l", "m", "n", "o", "p", "q", "r", "s", "t", "u", "v", "w", "x", "y", and "z") and single digit numbers (i.e., "1", "2", "3", "4", "5", "6", "7", "8", "9", and "0"). The pool 102 consists of special characters which are standard printable characters from a keyboard (i.e., "~", """, "!", "@", "#", "$", "%", "^", "&", "*", "(", ")", "_", "-", "+", "=", "{", "[", "}", "]", ":", ";", "'", " ", "<", ",", ">", ".", "?", and "/"). The pool 104 consists of individual uppercase or capital letters (i.e., "A", "B", "C", "D", "E", "F", "G", "H", "I", "J", "K", "L", "M", "N", "O", "P", "Q", "R", "S", "T", "U", "V", "W", "X", "Y", and "Z").

During operation, the electronic apparatus 26 provides an initial character string 110 which consists of random lowercase letters and numbers such as "wakdnrmbeodphjel". As will be explained shortly, the electronic apparatus 26 takes a series of hex values from the random number generator circuitry 66 (FIG. 2) and performs masking and conversion operations to generate the initial character string 110. Accordingly, each lowercase letter and number in the initial character string 110 is effectively randomly chosen. In the example initial character string 110 "wakdnrmbeodphjel", there are sixteen characters (16) by way of example only. Other numbers of characters are suitable for use as well (e.g., 20, 24, 30, . . . ) depending on factors such as available storage, desired security strength, processing power available, and so on.

Next, the electronic apparatus 26 incorporates one or more elements from the pool 102 of special characters. In particular, the electronic apparatus 26 identifies a random location within the initial character string 110 and replaces an original character (i.e., a lowercase letter or number) with a random element of the pool 102 of special characters. This location and element can be selected in response to output from the random number generator circuitry 66 (FIG. 2). Alternatively, the electronic apparatus 26 inserts random element of the pool 102 of special characters into the initial character string 110. Accordingly, each location within the initial character string 110 and each special character is randomly chosen.

It should be understood that such inclusion of a random special character from the pool 102 in a random location can be performed one or more times (e.g., once, twice, three times, etc.). In the example of FIG. 3, the initial character string 110 "wakdnrmbeodphjel" is altered into a partially modified character string 112 "wakd%rmb*odphjel" where the "n" in the fifth location of the initial character string 110 is replaced with the special character "%", and the "e" in the ninth location of the initial character string 110 is replaced with the special character "*".

Subsequently, the electronic apparatus 26 incorporates one or more elements from the pool 104 of uppercase letters. In particular, the electronic apparatus 26 identifies a random location within the partially modified character string 112 and replaces an existing character with a random element of the pool 104 of uppercase letters. This location and element can be selected in response to output from the random number generator circuitry 66 (FIG. 2). Alternatively, the electronic apparatus 26 inserts random element of the pool 104 of uppercase letters into the partially modified character string 112. As a result, each location within the partially modified character string 112 and each uppercase letter is randomly chosen.

It should be understood that such inclusion of a random uppercase letter from the pool 104 in a random location can be performed one or more times (e.g., once, twice, three times, etc.). In the example of FIG. 3, the partially modified character string 112 "wakd%rmb*odphjel" is altered into a fully modified character string 114 "wakd%rmD*odphjQl" where the "b" in the eighth location of the partially modified character string 112 is replaced with the uppercase letter "D", and the "e" in the fifteenth location of the partially modified character string 112 is replaced with the special character "Q".

At this point, the fully modified character string 114 is available for use as the high security password 46. In particular, the fully modified character string 114 fulfills certain extra predefined criteria above and beyond that of the initial character string 110. For example, the fully modified character string 114 has higher entropy than the initial character string 110. Furthermore, the fully modified character string 114 may satisfy certain additional criteria, rules and/or policies such as a requirement that the high security password 46 include exactly two special characters and exactly two uppercase letters. Of course, other criteria, rules and/or policies are suitable for use as well, e.g., a requirement for one special character and three uppercase letters, a requirement for two special characters and no uppercase letters, and so on.

FIG. 4 is a flowchart of a procedure 200 which is performed by the electronic apparatus 26 when supplying the high security password 46 of FIG. 3. At 202, the electronic apparatus 26 receives a command to supply a high security password (or key) 46. Such a command may come from a user in the process of configuring the data storage equipment 22 (FIG. 1). Alternatively, such a command may come automatically via a triggered event, manually upon request, and so on.

At 204, the random number generator circuitry 66 of the electronic apparatus 26 provides a series of hex values. The number of hex values is dictated by the required number of digits or characters in the high security password 46.

At 206, control circuitry which is formed by the processing circuitry 64 running the set of specialized applications 74 (FIG. 2) masks and converts each hex value in the series to an alphanumeric character that is either a lowercase letter or a number to form an initial character string 110 (FIG. 3).

At 208, the control circuitry takes further input from the random number generator circuitry 66 in order to randomly select a character position of the initial character string 110 and a special character to create a partially modified character string 112. As shown in FIG. 4, activity 208 may be repeated based on a password policy (e.g., M times due to a requirement for M special characters).

At 210, the control circuitry takes further input from the random number generator circuitry 66 in order to randomly select a character position of the initial character string 110 and an uppercase letter to further to make further character string modifications. As shown in FIG. 4, activity 210 may be repeated based on the password policy (e.g., N times due to a requirement for N uppercase letters).

At 212, the fully modified character string 112 is output as a response to the command. At this point, all or part of the fully modified character string 112 may be used as a highly secure password 46.

It should be understood that the above-described process performed inclusion of special characters before inclusion of uppercase letters by way of example only. In other arrangements, the above-described process performs inclusion of uppercase letters before inclusion of special characters.

It should be further understood that the elements of the pools 100, 102, 104 can be controlled, altered, etc. For example, particular lowercase letters can be purposefully omitted from the pool 100. Additionally, particular special characters can be purposefully omitted from or included in the pool 102. Furthermore, particular uppercase letters can be purposefully omitted from the pool 104.

Moreover, with the above-described step-by-step process other conditions may be imposed on the high security password 46. Along these lines, a policy/rule may impose the inclusion of a special character in a particular character location of the high security password 46 (e.g., the second location, the third location, etc.). Another policy/rule may impose the inclusion of an uppercase letter in a different character location of the high security password 46 (e.g., the last half of the password, within one of the last five character locations of the password, etc.), and so on. In some arrangements, the locations of the newly introduced characters are random while in other arrangements rules are imposed on the locations for the newly introduced characters. Other combinations and requirements are suitable for use as well. Further details will now be provided with reference to FIG. 5.

Figure 5:
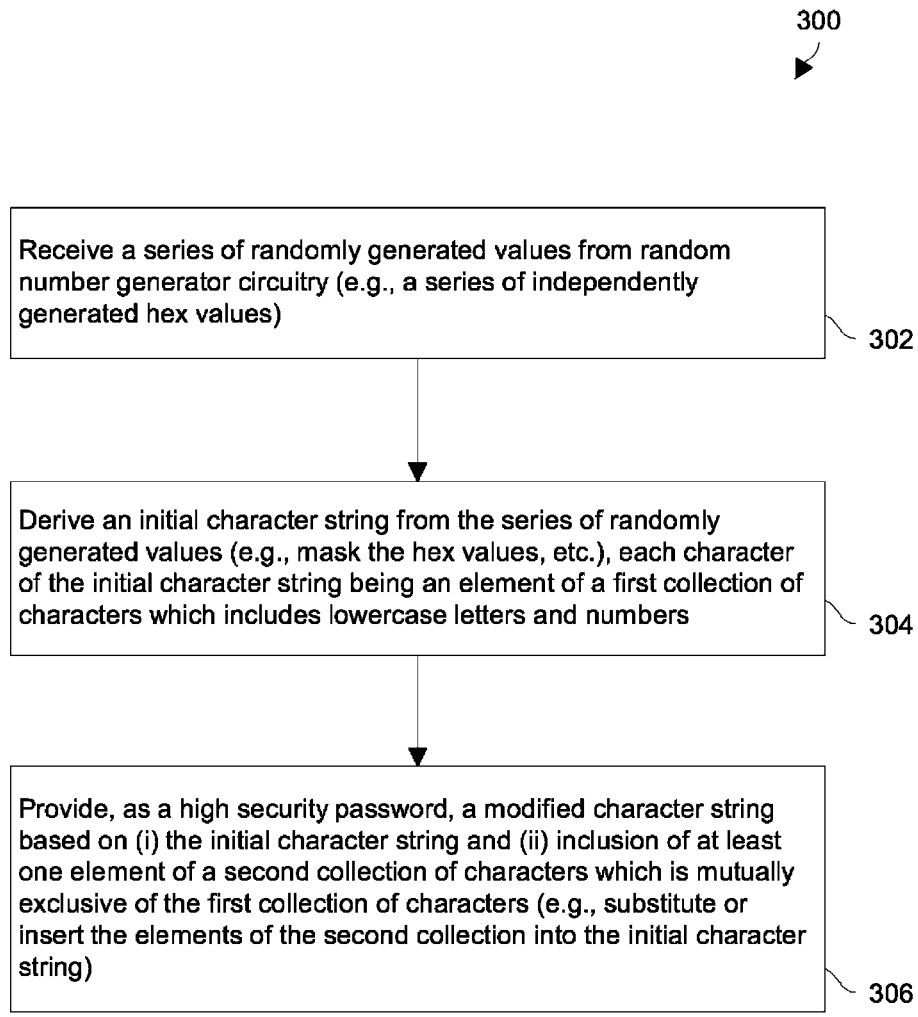
FIG. 5 is a flowchart of a procedure which is performed by the electronic apparatus of FIG. 2.

FIG. 5 is a flowchart of another procedure 300 which can be performed by the electronic apparatus 26 to supply a high security password 46. At 302, the electronic apparatus 26 receives a series of randomly generated values from random number generator circuitry.

At 304, the electronic apparatus 26 derives an initial character string from the series of randomly generated values. Each character of the initial character string is an element of a first collection of characters which includes lowercase letters and numbers. Along these lines, each randomly generated value can be masked and converted (e.g., via a mapping table) to an element of an alphabet or pool consisting only of lowercase letters and numbers.

At 306, the electronic apparatus 26 provides, as the high security password 46, a modified character string based on (i) the initial character string and (ii) inclusion of at least one element of a second collection of characters which is mutually exclusive of the first collection of characters. As mentioned earlier, providing the modified character string involves replacing (i.e., substituting) at least one character of the initial character string with an equal number of elements of the second collection of characters to form the modified character string. Alternatively, providing the modified character string involves inserting at least one character of the initial character string. The character or characters that are substituted or inserted may be special characters and/or uppercase letters.

Once the modified character string is available, it may be used to secure sensitive information such as storage drive encryption keys of a data storage system. Along these lines, the modified character string can be used to derive a key encryption key to encrypt the storage drive encryption keys. In some arrangements, the modified character string (or the strong encryption key 48 derived from the modified character string) is stored in the lockbox cryptographic repository along with other sensitive key manager configuration information as well. There are other uses for the high security password too.

As described above, improved techniques are directed to providing a high security password 46 from an initial character string 110 of lowercase letters and numbers, and inclusion of one or more other characters (e.g., uppercase letters, special characters such as !, @, #, $, %, and so on). The use of such a character combination results in a stronger password. Such a combination can also be made to comply with a set of password rules (e.g., a policy requiring the password to include exactly one uppercase letter, or one special character, or one uppercase letter and one special character, or one uppercase letter and two special characters, and so on). Due to the security strength of such passwords 46, such passwords 46 are well suited for particular situations such as deriving strong encryption keys 48 and protecting storage drive encryption keys in non-volatile storage.

One should appreciate that the above-described techniques do not merely generate passwords from an augmented password alphabet. Rather, the disclosed techniques involve deriving an initial character string of random lowercase letters and numbers from a randomly generated series of values, and then replacing a certain number of characters of the initial character string with uppercase letters and/or special characters. It should be understood that these techniques (compared to a process of simply augmenting a password alphabet to include lowercase letters, numbers, uppercase letters, and special characters) provide the ability to impose precise control over certain password policies and/or rules (e.g., requirements for specific numbers of uppercase letters or special characters in the password). Along these lines, an alternative process of simply generating a password from an augmented alphabet would require filtering/screening to discard non-compliant passwords and thus would not ensure that a proper password would be supplied in a controlled amount of time (e.g., time would be wasted rejecting non-compliant passwords). With the replacement techniques, other advantages are available as well such as improved control over selection of character positions (e.g., positions for uppercase letters, special characters, etc.) within the passwords, better control over the number and/or randomness such positions, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the high security password 46 was described above as including at least one uppercase letter and at least one special character. In other arrangements, the high security password 46 includes at least one uppercase letter and no special characters. In other arrangements, the high security password 46 includes at least one special character and no uppercase letters. In some arrangements, there is at least one of each but the random number generator circuitry 66 dictates the number of uppercase letters and/or the number of special characters in the high security password 46. In yet other arrangements, the high security password 46 includes at least one other type of character such as a non-keyboard symbol, a glyph, a hidden character, and so on. Such modifications and enhancements are intended to belong to various embodiments of the disclosure.

What is claimed is:

1. A method of supplying a high security password, the method comprising:
   receiving, by processing circuitry, a series of randomly generated values from random number generator circuitry;
   deriving, by the processing circuitry, an initial character string from the series of randomly generated values, each character of the initial character string being an element of a first collection of characters which includes lowercase letters and numbers; and providing, by the processing circuitry and as the high security password, a modified character string based on (i) the initial character string and (ii) inclusion of at least one element of a second collection of characters which is mutually exclusive of the first collection of characters;

wherein the method further comprises storing at least one of the modified character string and an encryption key derived from the modified character string together with sensitive key manager configuration information in a lockbox cryptographic repository; and wherein storing includes encrypting a set of data storage system encryption keys using the encryption key derived from the modified character string, the encrypted set of data storage system encryption keys forming at least part of the sensitive key manager configuration information.

2. A method as in claim 1 wherein providing the modified character string includes:

replacing at least one character of the initial character string with an equal number of elements of the second collection of characters to form the modified character string.

3. A method as in claim 2 wherein the first collection of characters consists of lowercase letters and numbers;

wherein the second collection of characters consists of uppercase letters; and wherein replacing includes substituting a particular character of the initial character string with a particular element of the second collection of characters.

4. A method as in claim 3 wherein substituting the particular character of the initial character string with the particular element of the second collection of characters includes:

choosing the particular element among other elements of the second collection of characters based on input from the random number generator circuitry.

5. A method as in claim 4 wherein substituting the particular character of the initial character string with the particular element of the second collection of characters further includes:

selecting, as a character to substitute, the particular character of the initial character string based on a character position identified by the random number generator circuitry.

6. A method as in claim 5 wherein replacing further includes substituting another character of the initial character string with another element of the second collection of characters.

7. A method as in claim 2 wherein the first collection of characters consists of lowercase letters and numbers;

wherein the second collection of characters consists of special characters; and wherein replacing includes substituting a particular character of the initial character string with a particular element of the second collection of characters.

8. A method as in claim 7 wherein substituting the particular character of the initial character string with the particular element of the second collection of characters includes:

choosing the particular element among other elements of the second collection of characters based on input from the random number generator circuitry.

9. A method as in claim 8 wherein substituting the particular character of the initial character string with the particular element of the second collection of characters further includes:

selecting, as a character to substitute, the particular character of the initial character string based on a character position identified by the random number generator circuitry.

10. A method as in claim 9 wherein replacing includes substituting another character of the initial character string with another element of the second collection of characters.

11. A method as in claim 2 wherein the first collection of characters consists of lowercase letters and numbers;

wherein the second collection of characters consists of (i) a pool of uppercase letters and (ii) a pool of special characters; and wherein replacing includes substituting (i) a first character of the initial character string with an element of the pool of uppercase letters and (i) a second character of the initial character string with an element of the pool of special characters.

12. A method as in claim 11 wherein substituting the first character includes:

choosing the element of the pool of uppercase letters among other elements of the pool of uppercase letters based on input from the random number generator circuitry, and selecting the first character of the initial character string among other characters of the initial character string based on other input from the random number generator circuitry; and wherein substituting the second character includes:

choosing the element of the pool of special characters among other elements of the pool of special characters based on additional input from the random number generator circuitry, and selecting the second character of the initial character string among other characters of the initial character string based on further input from the random number generator circuitry.

13. A method as in claim 1 wherein the processing circuitry is configured to operate as a data storage system that performs read and write operations on behalf of a set of host computers;

wherein the processing circuitry includes (i) a set of storage processors and (ii) an array of storage devices;

wherein each data storage system encryption key of the set of data storage system encryption keys encrypts host data prior to the set of storage processors storing that host data on a respective storage device of the array of storage devices; and wherein storing further includes:

after the encryption key derived from the modified character string is used to encrypt the set of data storage system encryption keys, writing the encrypted set of data storage system encryption keys to a physical location of the lockbox cryptographic repository.

14. A method as in claim 1, further comprising:

employing the set of data storage system encryption keys to securely write host data to and read host data from the array of storage devices.

15. An electronic apparatus, comprising:

random number generator circuitry;

memory; and control circuitry coupled to the random number generator circuitry and the memory, the memory storing instructions which, when carried out by the control circuitry, cause the control circuitry to:

receive a series of randomly generated values from random number generator circuitry, derive an initial character string from the series of randomly generated values, each character of the initial character string being an element of a first collection of characters which includes lowercase letters and numbers, and provide, as a high security password, a modified character string based on (i) the initial character string and (ii) inclusion of at least one element of a second collection of characters which is mutually exclusive of the first collection of characters;

wherein the control circuitry, when providing the modified character string, is constructed and arranged to:

replace at least one character of the initial character string with an equal number of elements of the second collection of characters to form the modified character string;

wherein the first collection of characters consists of lowercase letters and numbers;

wherein the second collection of characters consists of (i) a pool of uppercase letters and (ii) a pool of special characters; and wherein replacing includes:

choosing an element of the pool of uppercase letters among other elements of the pool of uppercase letters based on input from the random number generator circuitry, and identifying a first character of the initial character string to replace with the chosen element of the pool of uppercase letters based on other input from the random number generator circuitry; and choosing the element of the pool of special characters among other elements of the pool of special characters based on additional input from the random number generator circuitry, and identifying a second character of the initial character string to replace with the chosen element of the pool of special characters based on other input from the random number generator circuitry, the locations of the first character and the second character being different from each other wherein the electronic apparatus forms a portion of a data storage system; and wherein the control circuitry is further constructed and arranged to:

store at least one of the modified character string and an encryption key derived from the modified character string together with sensitive key manager configuration information in a lockbox cryptographic repository which is encrypted using the modified character string, the sensitive key manager configuration information including an encrypted set of storage drive keys for encrypting data stored on a set of storage drives of the data storage system.

16. A computer program product having a non-transitory computer readable medium which stores a set of instructions to supply a high security password, the set of instructions, when carried out by computerized circuitry, causing the computerized circuitry to perform a method of:

receiving a series of randomly generated values from random number generator circuitry;

deriving an initial character string from the series of randomly generated values, each character of the initial character string being an element of a first collection of characters which includes lowercase letters and numbers; and providing, as the high security password, a modified character string based on (i) the initial character string and (ii) inclusion of at least one element of a second collection of characters which is mutually exclusive of the first collection of characters wherein the method further comprises storing at least one of the modified character string and an encryption key derived from the modified character string together with sensitive key manager configuration information in a lockbox cryptographic repository and wherein storing includes encrypting a set of data storage system encryption keys using the encryption key derived from the modified character string, the encrypted set of data storage system encryption keys forming at least part of the sensitive key manager configuration information.

* * * * *